(No Model.)
R. CHANDLER.
CAR COUPLING.
No. 450,217. Patented Apr. 14, 1891.
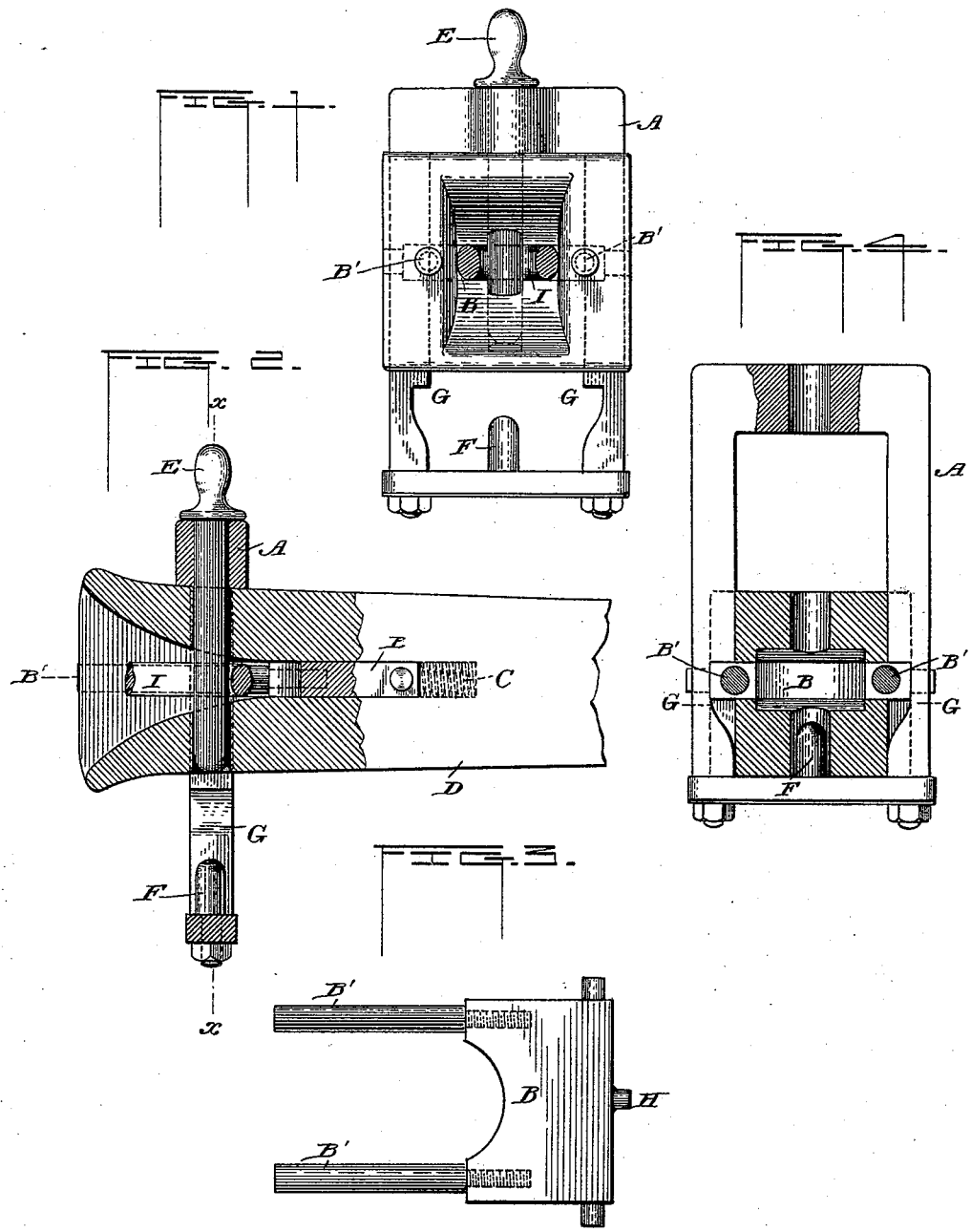

UNITED STATES PATENT OFFICE.

RICHARD CHANDLER, OF LONE STAR, TEXAS.

CAR-COUPLING.

SPECIFICATION forming part of Letters Patent No. 450,217, dated April 14, 1891.

Application filed January 20, 1891. Serial No. 378,451. (No model.)

*To all whom it may concern:*

Be it known that I, RICHARD CHANDLER, a citizen of the United States of America, residing at Lone Star, in the county of Cherokee and State of Texas, have invented certain new and useful Improvements in Car-Couplers, of which the following is a specification, reference being had therein to the accompanying drawings.

My invention relates to improvements in automatic car-couplers; and the object of my improvements is to provide the means for automatically coupling cars without exposing the operator to the risk and danger of going between the cars when coupling. I accomplish this object by the use of the mechanism set forth in the accompanying drawings, in which—

Figure 1 is a front elevation of the end of a draw-head having my improvements. Fig. 2 is a side elevation of same partly in elevation. Fig. 3 is a plan view of the tripping-plate; and Fig. 4 is a section in line $x\,x$, Fig. 2, showing part of my device in elevation.

Similar letters refer to similar parts throughout the several views.

My improvements consist, essentially, of the vertically-movable frame A, the tripping-plate B, the projecting fingers B', the spring C, the draw-head D, the link I, and the coupling-pin E, all in combination.

The cross-head of the vertical frame A has a vertical hole in the center, in which the coupling-pin E rests, and when said frame is let down, as shown in Fig. 1, said pin passes down into and through the draw-head D, as shown in Fig. 2. The side bars of said frame have the notches G, as shown in Figs. 2 and 4, and are adapted to engage the tripping-plate B when said frame is raised, so as to bring said notches above the line of said plate, as shown in Fig. 4, and by which the frame is held in elevation. The lower cross-piece of said frame is provided with a short fixed guide-pin F, adapted to enter the hole in the draw-head from the under side when the frame is raised, as shown in Fig. 4, the coupling-pin being suspended in the hole by the frame from above with its point just clear of the inside opening of the draw-head, so as to allow the link I to enter said opening without obstruction, the frame being held in elevation by the tripping plate B being forced forward by the spring C into the notches G.

The spring C is placed in a recess in the draw-head back of the tripping-plate, and is held in place by the projection H, being adapted automatically to force said plate forward toward the front and the fingers B' beyond the face of the draw-head D whenever the frame is raised, so as to bring the notches G above the line of said plate.

The fingers B' operate through parallel holes in the face of the draw-head, said holes being in the same plane with the draw-head and running back to the tripping-plate, the fingers being securely fastened into the front edge of said plate, as shown in Fig. 3.

The frame A may be raised by a chain or other suitable means attached to the cross-head and extending to the top of the car, from where, in case of freight-cars, it may be operated. This suggestion being no part of my invention is not shown in the drawings.

The operation of my invention is extremely simple. The several parts having been provided, as shown and described, to prepare for coupling cars the frame A is raised, by means of which the coupling-pin E is elevated, so that its point in the hole is just clear above the inside cavity in the draw-head D, the fixed guide-pin F entering at the same time the hole in said draw-head from below, and as the notches G come above the line of the tripping-plate B the spring C forces said plate forward into said notches, holding said frame in elevation, said frame holding the coupling-pin in such manner that no shock or jar can wedge or displace said pin or in any manner disturb it until said frame is tripped by the contact of the fingers B' with the approaching draw-head, bringing the link from the car to be coupled. As the link from the approaching car enters the opening in the draw-head D, the face of the approaching draw-head comes in contact with said fingers, forcing back the tripping-plate, causing the frame A to fall, the coupling-pin E in its fall passing through the link I and coupling the cars.

Having fully described my invention, what I claim as new, and desire to secure by Letters Patent, is—

1. In an automatic car-coupler, the combination of a vertical frame embracing the draw-head and adapted to move up or down in vertical grooves in the sides of the draw-head, its cross-head being provided with a vertical hole in the center adapted to carry the coupling-pin, its side bars being provided with the notches G and its lower cross-bar with the fixed guide-pin F, a tripping-plate adapted to engage said notches and to hold said frame when raised, projecting fingers B′, securely fastened into the front edge of said tripping-plate and operating through parallel holes in the face of the draw-head and in the same plane with the draw-head, a spring adapted to force said tripping-plate and said fingers to the front, a coupling-pin, and of a link, as and for the purposes substantially as set forth and described.

2. In an automatic car-coupler, the combination of the frame A, the tripping-plate B, the fingers B′, the spring C, the draw-head D, the coupling-pin E, the guide-pin F, the notches G, and the link I, all in combination, as and for the purposes substantially as set forth and described.

In testimony whereof I affix my signature in presence of two witnesses.

RICHARD CHANDLER.

Witnesses:
ISAAC M. SHEPHERD,
ALBERT M. HUNT.